United States Patent [19]

Lemoine et al.

[11] Patent Number: 5,414,029
[45] Date of Patent: May 9, 1995

[54] AQUEOUS BITUMEN-POLYMER EMULSIONS, THEIR METHOD OF PREPARATION AND THEIR USE

[75] Inventors: Guy Lemoine; Sophie Mariotti, both of le Havre, France

[73] Assignee: Total Raffinage Distribution S.A., Levallois Perret, France

[21] Appl. No.: 166,641

[22] Filed: Dec. 14, 1993

[30] Foreign Application Priority Data

Dec. 14, 1992 [FR] France .................................. 92 15017

[51] Int. Cl.$^6$ ............................................. C08L 95/00
[52] U.S. Cl. ......................................... 524/60; 524/59
[58] Field of Search ................. 524/59, 60, 68, 69, 524/70, 71

[56] References Cited

U.S. PATENT DOCUMENTS

| | | | |
|---|---|---|---|
| 4,038,096 | 7/1977 | Graf et al. | 106/277 |
| 5,068,270 | 11/1991 | Isobe et al. | 524/68 |
| 5,130,354 | 7/1992 | Gelles | 524/68 |
| 5,137,947 | 8/1992 | Isobe et al. | 524/68 |

FOREIGN PATENT DOCUMENTS

| | | |
|---|---|---|
| 0351736 | 1/1990 | European Pat. Off. . |
| 0467790 | 1/1992 | European Pat. Off. . |

*Primary Examiner*—Peter A. Szekely
*Attorney, Agent, or Firm*—A. Thomas S. Safford

[57] ABSTRACT

This bitumen-polymer emulsion contains:
 a) at least one bitumen,
 b) at least one polymer having hydrocarbon chains with mobile hydrogens, said polymer being grafted and crosslinked in situ in said bitumen through a complex of at least one organic silicon compound, said complex being formed from a primary constituent and a secondary constituent, the latter being an organic silicon compound,
 c) water, and
 d) at least one emulsifier.

79 Claims, No Drawings

AQUEOUS BITUMEN-POLYMER EMULSIONS, THEIR METHOD OF PREPARATION AND THEIR USE

RELATED APPLICATIONS

This application claims priority from French application Ser. No. 92 15017 filed Dec. 14, 1992, incorporated herein by reference. Reference is also made to commonly owned concurrently filed application, , "Bitumen-Polymer Compositions, Their Method of Preparation and Their Uses", Ser. No. 08/166642 which claims priority from French application Ser. No. 92 15016, filed Dec. 14, 1992; both of which are also incorporated herein by reference.

The invention relates to aqueous bitumen-polymer emulsions, their preparation and their uses, particularly for making bituminous coatings with improved physical properties.

BACKGROUND OF THE INVENTION

It is known that bitumen can be produced, in particular, from crude petroleum by distillation and deasphalting of the heavy fraction obtained by such distillation or distillations. Depending on the origin of the crude, bitumen consists of varying proportions of paraffinic oil (aliphatic or naphthenic), aromatic oil, resins and asphaltenes (on this subject, attention is directed to European Patent [EP] 246 956 and its U.S. equivalent, U.S. Pat. No. 4,810,367, both of which are owned by Applicants' assignee and are incorporated herein by reference).

Depending on its composition, bitumen can have a more or less thermoplastic character. It softens on heating, and its softening point, commonly referred to as its "ring-and-ball" temperature after the method of determination used (AFNOR[1] method NFT 66008), can vary from about 30° to about 130° C., depending on the process by which the bitumen was obtained.

[1] Association Francaise de Normalisation=French Association for Standardization These temperatures may be judged as insufficient for certain uses because of:
- risk of high temperature flow when used as sealing coatings;
- inadequate elastic behavior;
- inadequate heat resistance; for instance, in certain cements used for certain applications (automobile chassis).

Among the techniques for improving the heat resistance of bitumen are, in particular, the following.

1. Oxidation of bitumen by air blowing at about 250° C. However, the product thus obtained has disadvantages such as a high "ring-and-ball" temperature and is harder and more brittle.
2. Modification of bitumen by incorporation of certain polymers, which affords products with a "ring-and-ball" temperature as high as 120°-150° C. However, these products have disadvantages such as that at a temperature of 150° C., such products present only slight elastic properties.
3. Modification of bitumen by incorporation of a polymer such as SBR (styrene-butadiene rubber) or SBS (styrene-butadiene-styrene) which can be vulcanized with sulfur (or a sulfur donor) or a peroxide. However, this modification has disadvantages. It requires elevated and accurately controlled temperatures over a relatively long period of time. Further, product thus obtained has a very high viscosity and is not readily compatible with application methods used by the industry. Also, vulcanization imparts to it an irreversible character which is not conducive to easy use. The product must be used within weeks after its production, because its viscosity must remain compatible with that with which it will be used.

To attempt to circumvent these drawbacks, it has been proposed in Patent Application EP-A-0 467 790 to prepare an aqueous emulsion of a bitumen-polymer binder with a tridimensional polymeric structure. To this end, a blend containing:
- a molten bitumen-polymer composition that can be crosslinked with sulfur,
- an aqueous phase comprising an emulsifying system, and
- a sulfur-generating crosslinking system, is introduced into an emulsification zone and the zone is kept at a temperature from 50° to 160° C. until an emulsion of the bitumen-polymer binder is obtained wherein the polymer is crosslinked into a tridimensional structure. To prevent excessive crosslinking of the polymer and thus an excessively high viscosity of the bitumen-polymer composition, it is recommended to emulsify a blend of the composition and the crosslinking system immediately or soon after the composition is formed.

OBJECTS AND SUMMARY OF THE INVENTION

A purpose of the present invention is also to propose an aqueous crosslinked bitumen-polymer emulsion. However, the method of crosslinking and preparation differ fundamentally from those of EP-A-0 467 790 in that the crosslinking according to the present invention is carried out in a controlled fashion.

A purpose of the invention is to provide a bitumen-polymer composition which before the crosslinking of the polymer has a low viscosity facilitating its emulsification, said bitumen-polymer having a tridimensional polymeric structure that confers to the final product a high viscosity, high elasticity and high "ring-and-ball" temperature. Another purpose of the invention is to avoid the drawbacks of using products with excessively high viscosity.

In a first embodiment, the invention therefore provides a bitumen-polymer emulsion, characterized by the fact that it comprises:
a) at least one bitumen;
b) at least one polymer having hydrocarbon chains with mobile hydrogens or free electrons, said polymer being grafted and crosslinked in situ in the bitumen through a complex of at least one organic silicon compound, said complex being formed from a primary constituent for grafting an organic silicon compound onto the polymer and a secondary constituent, said secondary constituent being the organic silicon compound,
c) water, and
d) at least one emulsifying agent.

A further embodiment of the present invention provides a bitumen-polymer emulsion comprising:
at least one bitumen;
at least one polymer having hydrocarbon chains with mobile hydrogens or free electrons;
at least one organic silicon compound;

a compound for grafting the organic silicon compound onto the polymer;
water; and
at least one emulsifying agent;

Since the silicon and grafting compounds can be in the form of a complex, the invention also provides a bitumen-polymer emulsion comprising:
at least one bitumen;
at least one polymer having hydrocarbon chains with mobile hydrogens or free electrons;
a complex including a primary constituent for grafting an organic silicon onto the polymer and a secondary constituent comprising: at least one organic silicon or compound; and
at least one emulsifying agent;
wherein the organic silicon compound is grafted onto the polymer and the polymer crosslinked in situ in the bitumen.

The invention also may embody a kit for a bitumen-polymer emulsion comprising: (a) at least one bitumen, (b) at least one polymer having hydrocarbon chains with mobile hydrogens or free electrons, (c) an organic silicon compound, (d) a compound for grafting the organic silicon compound onto the polymer, and (e) at least one emulsifying agent. The kit may also optionally include water and/or instructions for use. Constituents (a), (b), (c), (d) and (e) may be separately packaged or, constituents (a) and (b) may be blended and packaged together as one component (i) and constituents (c) and (d) may be blended and packaged together as a second component (ii) such that the kit can comprise: (a), (b), (c), (d) and (e); (i), (c), (d) and (e); (a), (b), (ii) and (e); or (i), (ii) and (e). Of course, (a), (b), (c), (d) and (e) can also be provided admixed, in one package.

Another embodiment of the invention provides a process for preparing said emulsion, characterized by the fact that it comprises the following steps:
a) making a virtually homogeneous molten blend of at least one bitumen and at least one polymer having hydrocarbon chains with mobile hydrogens or free electrons, said polymer optionally first having been dissolved in a solvent, this step a) including the incorporation into the blend, kept in the molten state, of the primary and secondary constituents that bring about the formation of the complex and give rise to the grafting and crosslinking of the polymer, at least one of the secondary constituents being an organic silicon compound, optionally previously dissolved in the polymer solution;
b) keeping the product made in a) in the molten state with agitation for a length of time sufficient to achieve grafting of the complex of the organic silicon compound onto the polymer in the composition made in a);
c) incorporating with agitation into the bitumen-polymer composition obtained in b) an aqueous solution of the emulsifying agent at a temperature sufficient to maintain the bitumen-polymer composition in the molten state, said step c) leading to the formation of an emulsion.

More generally, the invention may embody a process for preparing a bitumen-emulsion comprising:
(a) blending in the molten state at least one bitumen and at least one polymer having hydrocarbon chains with mobile hydrogens or free electrons;
(b) adding to the molten blend a grafting agent for grafting an organic silicon compound onto the polymer;
(c) adding to the molten blend an organic silicon compound;
(d) grafting the organic silicon onto the polymer
(e) mixing into the molten blend of step (d) an aqueous solution of an emulsifying agent.

Steps (b) and (c) may be performed in either order: (b) first, then (c); or (c) first, then (b). Steps (b) and (c) may also be performed simultaneously. Steps (b) and (c) can be performed by adding an admixture or complex of the grafting agent and organic silicon compound. Thus, steps (b) and (c) can also be performed by forming the admixture or complex and then adding it to the molten blend.

Step (d) can be performed by blending, agitating or stirring the product of steps (a), (b) and (c) for a sufficient time to effect the grafting.

The invention also comprehends a bituminous coating obtained by evaporation of water from the emulsion. Such a coating preferably has a "ring-and-ball" temperature higher than 100° C. These and other objects and embodiments are disclosed or are obvious from the following detailed description.

DETAILED DESCRIPTION

The bitumen used in the practice of the invention, for instance in the bitumen-polymer emulsion, may be a bitumen herein referred to as a "natural" bitumen to differentiate it from the "synthetic" bitumen to be described hereinbelow. Natural bitumen can be obtained from crude petroleum, bituminous schists, heavy oils, bituminous sand, and the like or even carbon.

The bitumen can be, for example:
a) the heaviest fraction obtained by straight-run distillation of a crude at atmospheric or reduced pressure;
b) the heavy phase obtained by solvent deasphalting a heavy fraction obtained as in a);
c) the product obtained by oxidation, in the presence or absence of a catalyst, of a heavy fraction as per a) or a heavy phase as per b);
d) the product obtained by oxidation, in the presence or absence of a catalyst, of a blend of
a heavy fraction according to a) or a heavy phase according to b), and
a distillate, or
an aromatic extract obtained in the dearomatization of lubricating oils, or
a deasphalting pitch;
e) a blend of an oxidized product obtained as in b) or c) or of a hard base, and
a distillate, or
an aromatic extract obtained in the dearomatization of lubricating oils, or
a deasphalting pitch, or
a heavy fraction according to a) or a heavy phase according to b);
f) a visbroken base, alone or blended with one of the aforesaid products.

The bitumen used can also be a "synthetic" bitumen having characteristics similar to those of a "natural" bitumen described hereinabove, for example a synthetic clear binder colored by addition of pigments.

Such materials are, for example, the petroleum resins or indene-coumarone resins blended with aromatic and/or paraffinic hydrocarbons.

The petroleum resins can be prepared by polymerization of unsaturated hydrocarbons present in unsaturated petroleum fractions such as the fractions obtained by thermal or steam cracking or by pyrolysis.

Indene-coumarone resins are obtained from coal tar.

The polymer used in the practice of the invention is a polymer that has hydrocarbon chains with mobile hydrogens and can be selected from the group consisting of polyolefins such as poly-alpha-olefins or $C_1$-$C_{12}$ polyolefins, for instance polyethylene, polypropylene, polybutylene, polymers of hexene, polymers of 4-methyl-1-pentene or olefin copolymers, for instance copolymers or terpolymers of alpha-olefins such as $C_1$-$C_{12}$ alpha olefins, for example copolymers of ethylene and hexene, of ethylene and 4-methyl-1-pentene and the like, natural or synthetic rubbers, such as EPDM (ethylene-propylene-diene monomer)

EPM (ethylene-propylene monomer)

random styrene-butadiene copolymers such as SBR (styrene-butadiene rubber) or sequenced styrene-butadiene copolymers such as SBS (styrene-butadiene-styrene), linear or star copolymers, or SIS (styrene-isoprene-styrene), polyisobutylene (butyl rubber)

polybutadiene, polyisoprene, polynorbornene, polychloroprene, polyvinyl chloride ethylene-vinyl acetate copolymers.

The initial bitumen-polymer blend may contain up to 25 wt %, preferably 3 to 15 wt %, of polymer, depending on the nature of the polymer and the properties desired for the intended use.

The emulsion according to the invention preferably contains:

a) from 29 to 67 wt % of bitumen, b) from 1 to 13 wt % of crosslinked and grafted polymer, c) from 69.5 to 18 wt % of water, d) from 0.5 to 12 wt % of emulsifier, the crosslinked and grafted polymer containing up to 10 wt % of the complex (primary constituent + secondary constituent).

Applicants have successfully used EPDM containing from 45 to 80 wt % of ethylene units and having a weight-average molecular weight of 100,000 to 500,000 and a diene monomer unit content of 1 to 10 wt %; the diene monomer being, for example, ethylidenenorbornene, dicyclopentadiene or hexadiene.

Applicants have also successfully used a sequenced, star SBS.

To be readily compatible with the polymer, the bitumen composition should have an appropriate proportion of saturated and aromatic hydrocarbons and bituminous resins.

Without wishing to be bound by any one particular theory, Applicants believe that in the emulsion according to the invention the polymer onto which is grafted a complex of at least one organic silicon compound is subsequently crosslinked by hydrolysis of that compound.

The complex itself consists of a primary constituent combined with a secondary constituent, namely the organic silicon compound which in the following description, for merely simplicity (without wishing to necessarily limit the invention), shall be referred to as "silane" although it may contain atoms other than silicon and hydrogen, for example oxygen atoms.

The primary constituent whereby the secondary constituent is grafted onto the polymer is, for example, a sulfur-donating compound or a peroxide. The sulfur compound was found to perform better and is presently preferred.

Applicants have also successfully used dipentamethylenethiuram tetrasulfide. 4,4'-Dithiodimorpholine may also be used.

The silane is chosen on the basis of its molecular weight and boiling temperature. Suitable are, for example, chlorosilanes, for example trichlorosilane; organochlorosilanes, for example vinyltrichlorosilane, methyltrichlorosilane, methyldichlorosilane, dimethyldichlorosilane or methylvinyldichlorosilane; organosilane esters, such as methyltriethoxysilane or methyltrimethoxysilane, vinyltrimethoxysilane, vinyltris-(2-methoxyethoxy)silane or vinyltriacetoxysilane; or methacrylic, epoxy, mercapto and amino derivatives of silane. Among these compounds, vinyltris-(2-methoxyethoxy)silane is particularly preferred, because its boiling temperature is above 180° C.

In fact, a boiling temperature above 180° C. for the silane is preferred because the first step in the preparation of the bitumen-polymer emulsion according to the invention can consist of blending the polymer and the bitumen at a temperature between 150° and 230° C. The blending can be in a rotor-equipped dynamic mixing chamber for a period of 1 to 3 hrs. Preferably is thereby obtained a virtually homogeneous dispersion of the polymer in the bitumen. The mixing chamber can be a Rayneri turbine.

Before mixing, the polymer can be dissolved in a solvent, such as an aromatic solvent, for example an aromatic extract obtained in the production of lubricant bases.

During this step, the primary compound (for example the sulfur donor) and the secondary compound (silane) are incorporated simultaneously or successively, in either order, into the molten bitumen-polymer blend which is then agitated for a sufficient length of time to achieve the grafting of the silane derivative onto the polymer chains through the sulfur compound.

When the polymer is dissolved in a solvent, it is advantageous to use this solution for the incorporation of the primary and secondary compounds which as a result are better dispersed and may be used at a lower concentration.

After the addition of the primary and secondary compounds, the resulting hot blend wherein the crosslinking complex is beginning to form has a low viscosity which increases with time.

The crosslinking kinetics can be accelerated by incorporating a catalyst, for example a catalyst of the dibutyl tin dilaurate (DBTDL) type.

In the practice of the invention; for instance, in the emulsion or to prepare the emulsion according to the invention, an emulsifier is employed. The emulsifier can be a conventional emulsifier, namely a cationic, anionic, amphoteric or nonionic emulsifier.

For road applications, a preferred range of emulsifiers includes the cationic emulsifiers because of their chemical reactivity toward the aggregate. Suitable are, for example, amines such as tallow N-alkyl dipropylenepolyamines or diamines or alkyl imidazopolyamines or quaternary ammonium derivatives.

Emulsifiers such as polyvinyl alcohol can be used, especially for industrial applications. The amine cationic emulsifiers and polyvinyl alcohol emulsifier can be used as an aqueous solution.

As to the amine cationic emulsifiers, the aqueous solution of the cationic emulsifier contains from 0.1 to 2 wt % of an amine. As to polyvinyl alcohol as the emulsifier, the aqueous solution of polyvinyl alcohol contains from 1 to 10 wt % of this alcohol. The mixture of either of these solutions and the grafted bitumen-polymer blend can contain about 70 to 20 wt % of either of these aqueous solutions and about 30 to 80 wt % of the bitumen-polymer blend.

Preferred among the polyvinyl alcohols are those with an ester number of 50 to 200 and a viscosity of less than 15 mPa.s at 20° C. (according to German industrial standard DIN 53015).

The mixture of grafted bitumen-polymer and emulsifier solution is preferably kept at a temperature below 100° C. in a rotor-type emulsifying mixer.

The emulsion according to the invention can also be produced in an emulsification apparatus under pressure.

The emulsions according to the invention can be broken by evaporation of the water at room temperature or by heating. If rapid, controlled breaking is desired for specific applications, an appropriate conventional anionic or cationic emulsifier should be used either alone or in combination with polyvinyl alcohol.

If necessary, a pH-adjusting agent, namely a mineral or organic acid or base, can be added to the emulsion.

Other additives such as gelling agents of the kaolin or bentonite type or any other additive known for its thixotropic properties may be added to maintain the stability of the emulsion.

The bitumen-polymer compositions obtained by water evaporation from the emulsions according to the invention can have a ring-and-ball temperature that can exceed 100° C. and even 180° C. whereas before emulsification the grafted bitumen-polymer composition has a much lower ring-and-ball temperature. Moreover, the compositions have a satisfactory low-temperature resistance of about −20° C.

The bitumen-polymer emulsions of the invention are suitable for all common uses of bitumen emulsions, especially those of emulsions of modified bitumen.

The bitumen/polymer composition obtained by water evaporation from the emulsion according to the invention has a high viscosity, does not flow at high temperatures and has good adhesive properties. For these reasons, in coating applications and other industrial uses, this emulsion is particularly well suited as a replacement for certain polymeric coatings such as those of polyvinyl chloride plastisols, polymer solutions, latices, polymer emulsions or paints. Such emulsions are also suitable for road applications by the "cold" technique.

These uses of the emulsions of the invention constitute other embodiments of the present invention.

The invention may be further illustrated by the following non-limiting examples, many apparent variations of which of which are possible without departing from the spirit of the invention.

EXAMPLE 1

This example concerns the preparation of bitumen-polymer emulsion E1 according to the invention.

First, composition C was prepared from:

1) a bitumen of petroleum origin having the following characteristics:
   penetrability at 25° C. in 1/10 mm (by AFNOR method 66 004): 200,
   softening point in °C. (by AFNOR method NFT 66 008): 37,
2) an EPDM having the following characteristics:

| ethylene | 50 wt % |
|---|---|
| diene | 4 wt % |
| propylene | 46 wt % |
| weight-average molecular weight | 210,000 |

The bitumen (90 wt %) and EPDM (10 wt %) were mixed in a Rayneri blender at 190° C. for 2 hrs at the end of which the blend was homogeneous.

At this point, the following system constituting the grafting and crosslinking complex was incorporated:
  silane: vinyltris-(2-methoxyethoxy)silane: 3 wt %
  sulfur compound: dipentamethylenethiuram tetrasulfide: 0.5 wt %

The mixing was continued for 30 min at 190° C.

An emulsifying solution ES was prepared by mixing 83 wt % of water and 17 wt % of polyvinyl alcohol having the following characteristics:
  bulk density, g/cm$^3$: 0.60
  ester number 120 to 150
  viscosity at 20° C., mPa.s 4

Emulsion E1 was then prepared by mixing:
  50 wt % of composition C
  33.5 wt % of emulsifying solution ES
  15 wt % of water
  1.5 wt % of bentonite.

The emulsion was prepared with a high-speed mixer at atmospheric pressure. The temperatures of composition C and solution ES were such that the emulsion temperature was always below 100° C. The addition of bentonite ensured excellent storage stability.

The storage stability of the emulsion thus obtained (determined by ASTM method D244) was less than 10%, namely the segregation amounted to less than 10%.

The water of the emulsion was evaporated on a plate to give a 2 mm thick coating.

The mechanical properties of the coating were determined by method NFT 46-002.

Tensile tests were performed on dumbbell specimens at 20° C. and a pulling rate of 500 mm/minute. The test results are presented in Table 1 below.

TABLE 1

|  | Composition C Before Emulsification | Emulsion C Evaporated |
|---|---|---|
| Ring-and-ball temperature, °C. | 75 | >180 |
| Maximum elongation, % | 4000 | 200 |
| Strain at maximum elongation, 10$^5$ Pa | 0.15 | 3–4 |

The lower elongation value and the higher value of the strain at maximum elongation indicate that the emulsion is crosslinked.

EXAMPLE 2

Example 1 was repeated, but by starting from a bitumen with a penetrability of 45 tenths of a millimeter at 25° C. and a softening point of 52° C. (76 parts by weight) mixed with a white spirit solvent (11 parts by weight).

Emulsion E2 had the same characteristics as emulsion E1.

EXAMPLE 3

Example 1 was repeated, but by replacing the bitumen of petroleum origin with a synthetic bitumen with a penetrability of 200 tenths of a millimeter at 25° C., a ring-and-ball temperature of 45° C. and consisting of a mixture of a petroleum resin and an aromatic extract stemming from the extraction of aromatic hydrocarbons from a lubricating base.

The results obtained were the same as in Example 1.

EXAMPLE 4

This example concerns the preparation of a bitumen-polymer emulsion E4 according to the invention and its use for making a bituminous binder.

First, a composition C4 was prepared from:
a) a bitumen of petroleum origin having the following characteristics:
  penetrability at 25° C., in 10 mm (by AFNOR method NFT 66-004): 90
  softening point, in °C. (by AFNOR method NFT 66-008): 45
b) a SBS (styrene-butadiene-styrene) copolymer of the star type having the following characteristics:
  styrene, wt %: 30
  weight-average molecular weight: 350,000

The bitumen (97.5 parts by weight) and the SBS (2.5 parts by weight) were mixed at 180° C. for 3 hrs with 3 parts by weight of silane [vinyltris-(2-methoxyethoxy)-silane] and 0.5 part by weight of a sulfur compound (dipentamethylenethiuram tetrasulfide).

This gave a composition C4 with a softening point of 57° C.

An emulsifying solution ES4 was prepared by mixing at 150° C. 92.9 parts by weight of water, 4.3 parts by weight of a mixture of fatty amines and 2.8 parts by weight of hydrochloric acid, density 1.16.

An emulsion E4 was then prepared by mixing:
65 parts by weight of composition C4
35 parts by weight of emulsifying solution E4

The water of the emulsion was evaporated on a plate to give a 2 mm thick coating.

The softening point of the binder thus obtained was determined and found to be above 130° C.

Emulsion E4 according to the invention obtained from SBS thus makes it possible to prepare bituminous coatings with a high softening point.

EXAMPLE 5

This example concerns the preparation of two bitumen-polymer emulsions according to the invention, E51 and E52, and their use for making bituminous coatings.

The same bitumen and the same SBS polymer as in Example 4 were used.

First, a stock solution SS was prepared by mixing the following in parts by weight:

| | |
|---|---|
| aromatic oils | 85 |
| SBS polymer | 15 |
| silane (same as in Example 4) | 6 |
| sulfur compound (same as in Example 4) | 1 |

The bitumen (83 parts by weight) was then mixed with 17 parts by weight of stock solution SS to obtain composition C51.

In composition C51, the amounts of silane and sulfur compound were 1 wt % and 0.17 wt %, respectively. The polymer content was 2.5 parts by weight.

A composition C52 was prepared by mixing:
83 parts by weight of bitumen
14.5 parts by weight of aromatic oil
2.5 parts by weight of SBS polymer
3 parts by weight of silane
0.5 part by weight of sulfur compound.

The mixtures were made as in Example 4.

The softening points of compositions C51 and C52 were 53° C. and 52° C., respectively; in other words, they were practically identical.

From compositions C51 and C52 were prepared as in Example 4 two emulsions E51 and E52 which after drying (as in Example 4) gave two coatings with practically identical softening points of 94° C. and 95° C.

By use of stock solutions, the amount of silane and sulfur compound can be reduced by a factor of three.

Having described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. A bitumen-polymer emulsion comprising:
a) at least one bitumen;
b) at least one polymer having hydrocarbon chains with mobile hydrogens or free electrons, said polymer being grafted and crosslinked in situ in the bitumen through a complex of at least one organic silicon compound, said complex being formed from a primary constituent for grafting an organic silicon compound onto the polymer and a secondary constituent, said secondary constituent being the organic silicon compound,
c) water, and
d) at least one emulsifying agent;
  wherein the primary constituent is dipentamethylenethiuram tetrasulfide.

2. The emulsion according to claim 1 it contains a "natural" bitumen.

3. The emulsion according to claim 1 wherein the fact that it contains a "synthetic" bitumen.

4. The emulsion according to claims 1 wherein the polymer is selected from the group consisting of:
a) a polyolefin selected from the group consisting of polyethylene, polypropylene and olefin copolymers;
b) a natural or synthetic rubber selected from the group consisting of:
  EPDM (ethylene-propylene-diene monomer),
  EPM (ethylene-propylene monomer),
  random styrene-butadiene copolymers including SBR (styrene-butadiene rubber), sequenced styrene-butadiene copolymers selected from the group consisting of SBS (styrene-butadiene-styrene), linear or star copolymers, and SIS (styrene-isoprene-styrene),
  polyisobutylene (butyl rubber),
  polybutadiene,
  polyisoprene,
  polynorbornene, and polychloroprene;
c) polyvinyl chloride; and
d) ethylene-vinyl acetate copolymers.

5. The emulsions according to claim 1 wherein it contains up to 25 parts by weight of polymer per 75 parts by weight of bitumen.

6. The according to claim 5 wherein it contains 3 to 15 parts by weight of polymer per 97 to 85 parts by weight of bitumen.

7. The emulsion according to claim 1 wherein it contains:
a) from 29 to 67 wt % of bitumen,
b) from 1 to 13 wt % of crosslinked and grafted polymer
c) from 69.5 to 18 wt % of water
d) from 0.5 to 12 wt % of emulsifying agent.

8. The emulsion according to claim 1 wherein the primary constituent is a sulfur donor or a peroxide.

9. The emulsion according to claim 1 wherein the secondary constituent is a silane selected from the group consisting of chlorosilanes, organosilanes, organosilane esters, a methacrylic derivative of silane, an epoxy derivative of silane, a mercapto derivative of silane and an amino derivative of silane.

10. The emulsion according to claim 9 wherein the silane is selected from the group consisting of trichlorosilane, vinyltrichlorosilane, methyltrichlorosilane, methyldichlorosilane, dimethyldichlorosilane methylvinyldichlorosilane, methyltriethoxysilane methyltrimethoxysilane, vinyltrimethoxysilane, vinyltris-(2-methoxyethoxy)silane and vinyltriacetoxysilane.

11. The emulsion according to claim 10 wherein the silane is vinyltris-(2-methoxyethoxy)silane.

12. The emulsion according to claim 1 wherein the polymer is EPDM with an ethylene unit content of 45 to 80 wt %,
a weight-average molecular weight of 100,000 to 500,000 and a monomer diene unit content of 1 to 10 wt %.

13. The emulsion according to claim 1 wherein the polymer is a sequenced, styrene-butadiene (SBS) star copolymer.

14. The emulsion according to claim 1 wherein the emulsifying agent polyvinyl alcohol present in an amount of 0.2 to 7 parts by weight per 30 to 80 parts by weight of bitumen and grafted polymer.

15. The emulsion according to claim 14, wherein the polyvinyl alcohol has an ester number from 50 to 200 and a viscosity at 20° C. of less than 15 mPa.s.

16. The emulsion according to claim 1 wherein the emulsifying agent is an amine or a mixture of amines.

17. A process for preparing a bitumen-polymer emulsion which comprises the following steps:
a) making a virtually homogeneous molten mixture of at last one bitumen and at least one polymer having hydrocarbon chains with mobile hydrogens or free electrons, said polymer optionally first having been dissolved in a solvent, this step a) including blending into the mixture in the molten state, a primary constituent for grafting an organic silicon compound onto the polymer and a secondary constituent comprising at least one organic silicon compound, said secondary constituent being optionally previously dissolved in the polymer solution,
b) maintaining the product obtained in a) in the molten state, with agitation, for a sufficient time to achieve grafting of the organic silicon compound onto the polymer,
c) incorporating with agitation into the bitumen-polymer compound obtained in b) an aqueous solution of the emulsifying agent at a temperature sufficient to maintain the bitumen-polymer composition in the molten state, said step c) leading to the formation of an emulsion.

18. Process according to claim 17, wherein the blending of the bitumen and the polymer is carried out at a temperature of 150° to 230° C.

19. A bitumen-polymer emulsion comprising:
at least one bitumen;
at least one polymer having hydrocarbon chains with mobile hydrogens or free electrons;
at least one organic silicon compound;
a compound for grafting the organic silicon compound onto the polymer;
water; and
at least one emulsifying agent;
wherein the organic silicon compound is grafted onto the polymer and the polymer crosslinked in situ in the bitumen.

20. A process for preparing bitumen-polymer emulsion comprising:
(a) blending in the molten state at least one bitumen and at least one polymer having hydrocarbon chains with mobile hydrogens or free electrons;
(b) adding to the molten blend a grafting agent for grafting an organic silicon compound onto the polymer;
(c) adding to the molten blend an organic silicon compound;
(d) grafting the organic silicon onto the polymer
(e) mixing into the molten blend of step (d) an aqueous solution of an emulsifying agent.

21. The process of claim 20 wherein step (c) is performed before step (b).

22. A kit for a bitumen-polymer emulsion comprising: (a) at least one bitumen; (b) at least one polymer having hydrocarbon chains with mobile hydrogens or free electrons, (c) an organic silicon compound, (d) a compound for grafting the organic silicon compound onto the polymer, and (e) at least one emulsifier; wherein said kit optionally includes water and, wherein constituents (a), (b), (c), (d) and (e) are separately packaged; or constituents (a) and (b) are blended and packaged together as one component (i) and constituents (c) and (d) are blended and packaged together as a second component; and wherein the compound for grafting the organic silicon compound onto the polymer is dipentamethylenethiuram tetrasulfide.

23. A bituminous coating obtained by evaporation of water from the emulsion of claim 1.

24. The coating of claim 23 having a "ring-and-ball" temperature greater than 100° C.

25. A bitumen-polymer emulsion comprising:
a) at least one bitumen;
b) at least one polymer having hydrocarbon chains with mobile hydrogens or free electrons, said polymer being grafted and crosslinked in situ in the bitumen through a complex of at least one organic silicon compound, said complex being formed from a primary constituent for grafting an organic silicon compound onto the polymer and a secondary constituent, said secondary constituent being the organic silicon compound,
c) water, and d) at least one emulsifying agent; wherein the polymer is EPDM with an ethylene unit content of 45 to 80 wt %, a weight-average molecular weight of 100,000 to 500,000 and a monomer diene unit content of 1 to 10 wt %.

26. The emulsion according to claim 25 it contains a "natural" bitumen.

27. The emulsion according to claim 25 wherein the fact that it contains a "synthetic" bitumen.

28. The emulsion according to claim 25 wherein it contains up to 25 parts by weight of polymer per 75 parts by weight of bitumen.

29. The emulsion according to claim 28 wherein it contains 3 to 15 parts by weight of polymer per 97 to 85 parts by weight of bitumen.

30. The emulsion according to claim 25 wherein it contains:
a) from 29 to 67 wt % of bitumen,
b) from 1 to 13 wt % of crosslinked and grafted polymer
c) from 69.5 to 18 wt % of water
d) from 0.5 to 12 wt % of emulsifying agent.

31. The emulsion according to claim 25 wherein the primary constituent is a sulfur donor or a peroxide.

32. The emulsion according to claim 25 the secondary constituent is a silane selected from the group consisting of chlorosilanes, organosilanes, organosilane esters, a methacrylic derivative of silane, an epoxy derivative of silane, a mercapto derivative of silane and an amino derivative of silane.

33. The emulsion according to claim 32 wherein the silane is selected from the group consisting of trichlorosilane, vinyltrichlorosilane, methyltrichlorosilane, methyldichlorosilane, dimethyldichlorosilane methylvinyldichlorosilane, methyltriethoxysilane methyltrimethoxysilane, vinyltrimethoxysilane, vinyltris-(2-methoxyethoxy)silane and vinyltriacetoxysilane.

34. The emulsion according to claim 33 wherein the silane is vinyltris-(2-methoxyethoxy)silane.

35. The emulsion according to claim 25, wherein the emulsifying agent is polyvinyl alcohol present in an amount of 0.2 to 7 parts by weight per 30 to 80 parts by weight of bitumen and grafted polymer, and, the polyvinyl alcohol has an ester number from 50 to 200 and a viscosity at 20° C. of less than 15 mPa.s.

36. The emulsion according to claim 25 wherein the emulsifier is an amine or a mixture of amines.

37. A bituminous coating obtained by evaporation of water from the emulsion of claim 25.

38. The coating of claim 37 having a "ring-and-ball" temperature greater than 100° C.

39. A kit for a bitumen-polymer emulsion comprising: (a) at least one bitumen; (b) at least one polymer having hydrocarbon chains with mobile hydrogens or free electrons, (c) an organic silicon compound, (d) a compound for grafting the organic silicon compound onto the polymer, and (e) at least one emulsifier; wherein said kit optionally includes water and, wherein constituents (a), (b), (c), (d) and (e) are separately packaged; or constituents (a) and (b) are blended and packaged together as one component (i) and constituents (c) and (d) are blended and packaged together as a second component (ii) such that the kit can comprise (i), (c), (d) and (e); (a), (b), (ii) and (e); or (i), (ii) and (e); or constituents (a), (b), (c), (d) and (e) are blended and packaged together as one component; and wherein the polymer is EPDM with an ethylene unit content of 45 to 80 wt %, a weight-average molecular weight to 100,000 to 500,000 and a monomer diene unit content of 1 to 10 wt %.

40. A bitumen-polymer emulsion comprising:
a) at least one bitumen;
b) at least one polymer having hydrocarbon chains with mobile hydrogens or free electrons, said polymer being grafted and crosslinked in situ in said bitumen through a complex including at least one organic silicon compound, said complex being formed from a primary constituent for grafting an organic silicon onto the polymer and a secondary constituent, said secondary constituent being the organic silicon compound,
c) water, and
d) at least one emulsifying agent; wherein the polymer is a sequenced, styrene-butadiene (SBS) star copolymer.

41. The emulsion according to claim 40 it contains a "natural" bitumen.

42. The emulsion according to claim 40 wherein the fact that it contains a "synthetic" bitumen.

43. The emulsion according to claim 40 wherein it contains up to 25 parts by weight of polymer per 75 parts by weight of bitumen.

44. The emulsion according to claim 43 wherein it contains 3 to 15 parts by weight of polymer per 97 to 85 parts by weight of bitumen.

45. The emulsion according to claim 40 wherein it contains:
a) from 29 to 67 wt % of bitumen,
b) from 1 to 13 wt % of crosslinked and grafted polymer
c) from 69.5 to 18 wt % of water
d) from 0.5 to 12 wt % of emulsifying agent.

46. The emulsion according to claim 40 wherein the primary constituent is a sulfur donor or a peroxide.

47. The emulsion according to claim 40 the secondary constituent is a silane selected from the group consisting of chlorosilanes, organosilanes, organosilane esters, a methacrylic derivative of silane, an epoxy derivative of silane, a mercapto derivative of silane and an amino derivative of silane.

48. The emulsion according to claim 47 wherein the silane is selected from the group consisting of trichlorosilane, vinyltrichlorosilane, methyltrichlorosilane, methyldichlorosilane, dimethyldichlorosilane methylvinyldichlorosilane, methyltriethoxysilane methyltrimethoxysilane, vinyltrimethoxysilane, vinyltris-(2-methoxyethoxy)silane and vinyltriacetoxysilane.

49. The emulsion according to claim 48 wherein the silane is vinyltris-(2-methoxyethoxy)silane.

50. The emulsion according to claim 40, wherein the emulsifying agent is polyvinyl alcohol present in an amount of 0.2 to 7 parts by weight per 30 to 80 parts by weight of bitumen and grafted polymer, and, the polyvinyl alcohol has an ester number from 50 to 200 and a viscosity at 20° C. of less than 15 mPa.s.

51. The emulsion according to claim 40 wherein the emulsifier is an amine or a mixture of amines.

52. A bituminous coating obtained by evaporation of water from the emulsion of claim 40.

53. The coating of claim 52 having a "ring-and-ball" temperature greater than 100° C.

54. A kit for a bitumen-polymer emulsion comprising: (a) at least one bitumen; (b) at least one polymer having hydrocarbon chains with mobile hydrogens or free electrons, (c) an organic silicon compound, (d) a compound for grafting the organic silicon compound onto the polymer, and (e) at least one emulsifier; wherein said kit optionally includes water and, wherein constituents (a), (b), (c), (d) and (e) are separately packaged; or constituents (a) and (b) are blended and packaged together as one component (i) and constituents (c) and (d) are blended and packaged together as a second component (ii) such that the kit can comprise (i), (c), (d) and (e); (a), (b), (ii) and (e); or (i), (ii) and (e); or constituents (a), (b), (c), (d) and (e) are blended and packaged together as one component; and wherein the polymer is a sequenced, styrene-butadiene (SBS) star copolymer.

55. A bitumen-polymer emulsion comprising:
a) at least one bitumen;
b) at least one polymer having hydrocarbon chains with mobile hydrogens or free electrons, said polymer being grafted and crosslinked in situ in said bitumen through a complex including at least one organic silicon compound, said complex being formed from a primary constituent for grafting an organic silicon onto the polymer and a secondary constituent, said secondary constituent being the organic silicon compound,
c) water, and
d) at least one emulsifying agent;
wherein the emulsifying agent is polyvinyl alcohol present in an amount of 0.2 to 7 parts by weight per 30 to 80 parts by weight of bitumen and grafter polymer.

56. The emulsion according to claim 55 it contains a "natural" bitumen.

57. The emulsion according to claim 55 wherein the fact that it contains a "synthetic" bitumen.

58. The emulsion according to claims 55 wherein the polymer is selected from the group consisting of:
a) a polyolefin selected from the group consisting of polyethylene, polypropylene and olefin copolymers;
b) a natural or synthetic rubber selected from the group consisting of:
EPDM (ethylene-propylene-diene monomer),
EPM (ethylene-propylene monomer),
random styrene-butadiene copolymers including SBR (styrene-butadiene rubber), sequenced styrene-butadiene copolymers selected from the group consisting of SBS (styrene-butadiene-styrene), linear or star copolymers, and SIS (styrene-isoprene-styrene),
polyisobutylene (butyl rubber),
polybutadiene,
polyisoprene,
polynorbornene, and
polychloroprene;
c) polyvinyl chloride; and
d) ethylene-vinyl acetate copolymers.

59. The emulsion according to claim 55 wherein it contains up to 25 parts by weight of polymer per 75 parts by weight of bitumen.

60. The emulsion according to claim 59 wherein it contains 3 to 15 parts by weight of polymer per 97 to 85 parts by weight of bitumen.

61. The emulsion according to claim 55 wherein the primary constituent is a sulfur donor or a peroxide.

62. The emulsion according to claim 55 the secondary constituent is a silane selected from the group consisting of chlorosilanes, organosilanes, organosilane esters, a methacrylic derivative of silane, an epoxy derivative of silane, a mercapto derivative of silane and an amino derivative of silane.

63. The emulsion according to claim 62 wherein the silane is selected from the group consisting of trichlorosilane, vinyltrichlorosilane, methyltrichlorosilane, methyldichlorosilane, dimethyldichlorosilane methylvinyldichlorosilane, methyltriethoxysilane methyltrimethoxysilane, vinyltrimethoxysilane, vinyltris-(2-methoxyethoxy)silane and vinyltriacetoxysilane 64. The emulsion according to claim 63 wherein the silane is vinyltris-(2-methoxyethoxy)silane 65. The emulsion according to claim 55 wherein the polymer is EPDM with an ethylene unit content of 45 to 80 wt %,
a weight-average molecular weight of 100,000 to 500,000 and a monomer diene unit content of 1 to 10 wt %.

66. The emulsion according to claim 55 wherein the polymer is a sequenced, styrene-butadiene (SBS) star copolymer.

67. The emulsion according to claim 55, wherein the polyvinyl alcohol has an ester number from 50 to 200 and a viscosity at 20° C. of less than 15 mPa.s.

68. A bituminous coating obtained by evaporation of water from the emulsion of claim 55.

69. The coating of claim 68 having a "ring-and-ball" temperature greater than 100° C.

70. A kit for a bitumen-polymer emulsion comprising: (a) at least one bitumen; (b) at least one polymer having hydrocarbon chains with mobile hydrogens or free electrons, (c) an organic silicon compound, (d) a compound for grafting the organic silicon compound onto the polymer, and (e) at least one emulsifier; wherein said kit optionally includes water and, wherein constituents (a), (b), (c), (d) and (e) are separately packaged; or constituents (a) and (b) are blended and packaged together as one component (i) and constituents (c) and (d) are blended and packaged together as a second component (ii) such that the kit can comprise (i), (c), (d) and (e); (a), (b), (ii) and (e); or (i), (ii) and (e); or constituents (a), (b), (c), (d) and (e) are blended and packaged together as one component and wherein the emulsifier is polyvinyl alcohol present in an amount of 0.2 to 7 parts by weight per 30 to 80 parts by weight of bitumen and grafted polymer.

71. The process of claim 20 wherein steps (b) and (c) are performed simultaneously.

72. The process of claim 20 wherein steps (b) and (c) are performed by adding an admixture or complex of the grafting agent and organic silicon compound.

73. A bitumen-polymer emulsion comprising:
a) at least one bitumen;
b) at least one polymer having hydrocarbon chains with mobile hydrogens or free electrons, said polymer being grafted and crosslinked in situ in said bitumen through a complex including at least one organic silicon compound, said complex being formed from a primary constituent for grafting an organic silicon onto the polymer and a secondary constituent, said secondary constituent being the organic silicon compound,
c) water, and
d) at least one emulsifying agent.

74. The emulsion according to claim 73 wherein the polymer is selected from the group consisting of:
a) a polyolefin selected from the group consisting of polyethylene, polypropylene and olefin copolymers;
b) a natural or synthetic rubber selected from the group consisting of:

EPDM (ethylene-propylene-diene monomer),
EPM (ethylene-propylene monomer),
random styrene-butadiene copolymers including SBR (styrene-butadiene rubber), sequenced styrene-butadiene copolymers selected from the group consisting of SBS (styrene-butadiene-styrene), linear or star copolymers, and SIS (styrene-isoprene-styrene),
polyisobutylene (butyl rubber),
polybutadiene,
polyisoprene,
polynorbornene, and
polychloroprene;
c) polyvinyl chloride; and
d) ethylene-vinyl acetate copolymers.

75. The emulsion according to claim 73 wherein it contains up to 25 parts by weight of polymer per 75 parts by weight of bitumen.

76. The compositions according to claim 75 wherein it contains 3 to 15 parts by weight of polymer per 97 to 85 parts by weight of bitumen.

77. The emulsion according to claim 73 wherein it contains:
a) from 29 to 67 wt % of bitumen,
b) from 1 to 13 wt % of crosslinked and grafted polymer
c) from 69.5 to 18 wt % of water
d) from 0.5 to 12 wt % of emulsifier.

78. The emulsion according to claim 1 wherein the primary constituent is a sulfur donor or a peroxide.

79. The emulsion according to claim 8 wherein the fact that the primary constituent is dipentamethylenethiuram tetrasulfide.

* * * * *